April 8, 1958 W. H. FERGUSON ET AL 2,830,127

INTERPHONE COMMUNICATIONS CIRCUIT

Filed Feb. 10, 1956 2 Sheets-Sheet 1

INVENTORS
WILLIAM H. FERGUSON
ROBERT E. RAWLINS

By George A. Sullivan
Agent

INTERPHONE COMMUNICATIONS CIRCUIT

Filed Feb. 10, 1956 2 Sheets-Sheet 2

INVENTORS
WILLIAM H. FERGUSON
ROBERT E. RAWLINS
By George C. Sullivan
Agent

United States Patent Office 2,830,127

Patented Apr. 8, 1958

2,830,127

INTERPHONE COMMUNICATIONS CIRCUIT

William H. Ferguson, Pacoima, and Robert E. Rawlins, North Hollywood, Calif., assignors to Lockheed Aircraft Corporation, Burbank, Calif.

Application February 10, 1956, Serial No. 564,829

8 Claims. (Cl. 179—37)

Figure 1:
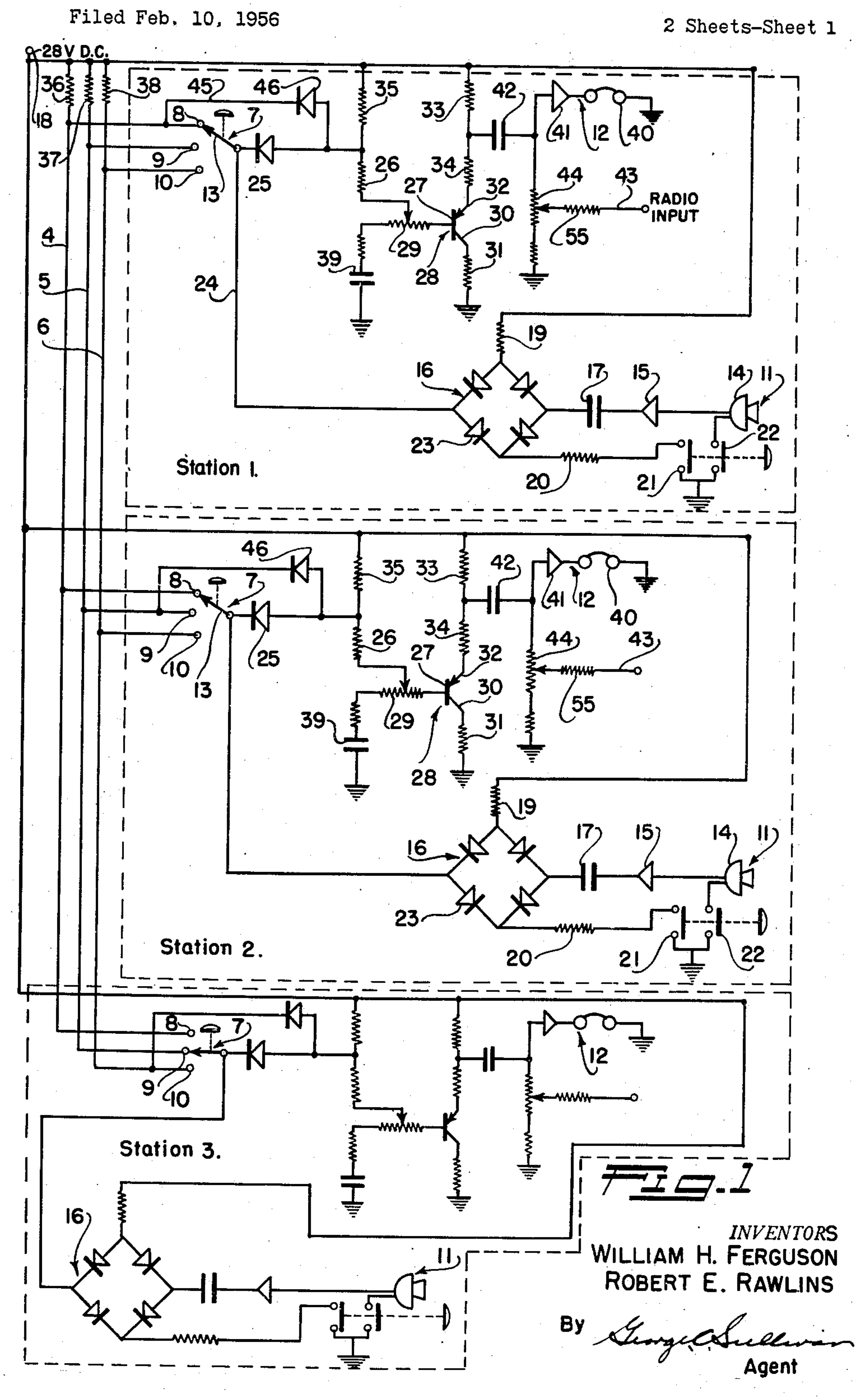

This invention relates generally to communications systems and more particularly to a simplified mutiple station interphone system wherein the transmitting and receiving of information may be accomplished through the use of one and the same line. The simplicity of the circuit makes it ideal for use in aircraft as well as other applications such as large office buildings and hotels and the like, where wired sound communication is desired.

Basically, the system employs a plurality of transmitting and receiving stations powered by a suitable source of direct current potential and coupled to each other through gating devices which normally isolate one station from another. The gating circuits for isolation are arranged so that the receiving circuit of one of the plurality of stations may be electrically connected to the transmitting circuit of one or more of the other plurality of stations by simply closing a switch at the transmitting circuit. The closing of the switch effectively changes the bias of the associated gating circuits which are normally closed and allows current flow therethrough. This is accomplished employing only one line for each station, thus allowing the design of a quite simple and economical interphone system which is light in weight and highly dependable in operation. The conventional use of relays in the gating circuits is avoided.

An object of this invention is to provide an interphone system circuit which will dependably provide communication between any two of a plurality of stations through the use of but one line per station. This is particularly important in providing a system which may be packaged in a small space such as is required for use in aircraft.

Another object of this invention is to provide an interphone system circuit incorporating automatic muting means whereby a radio input may be applied to the receiver at each station and have the volume thereof automatically reduced in response to an audio signal from one of the other interphone stations.

Another object of this invention is to provide an interphone system having gating means for effectively isolating the audio transmitting and receiving circuits of each station from each other as well as from other stations whereby interference between stations is avoided.

Another object of this invention is to provide an interphone system which is light in weight and which is dependable in operation with little power drain on the electrical system as compared with the more conventional types of interphone systems.

Further and other objects will become apparent from a reading of the following with the accommpanying drawing wherein like numerals refer to like parts.

Figure 2:
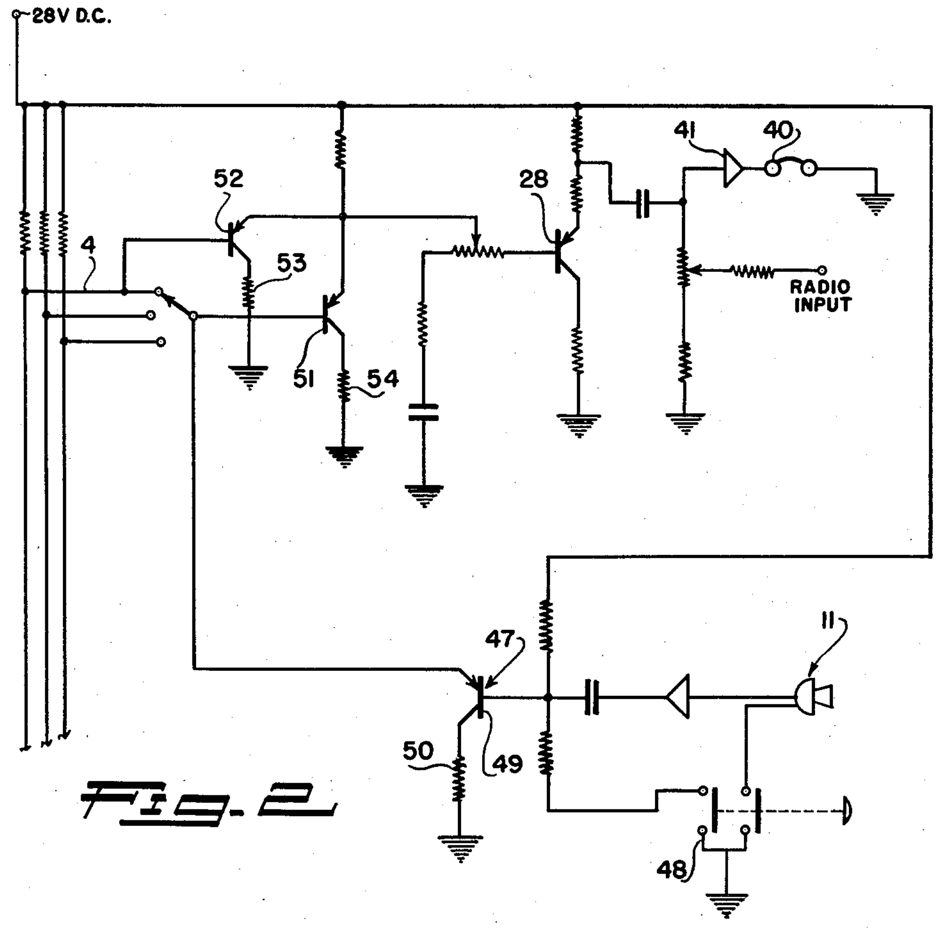

In the drawing:

Figure 1 is a circuit schematic of a multiple station interphone system incorporating the teachings of this invention; and Figure 2 is a circuit schematic showing a modified form of the interphone circuit of Figure 1.

Referring to Figure 1 the interphone system includes a plurality of stations 1, 2 and 3 electrically connected by interstation leads 4, 5 and 6, one for each station. A station selector switch 7 having contacts 8, 9 and 10, one for each interphone line, provides means whereby each station operator may connect with any of the plurality of stations in the system.

Each station includes a transmitting section 11 and a receiving section 12. The transmitting section of each station comprises a microphone 14 which drives a suitable amplifier 15, the output of which is coupled with selector arm 13 of switch 7 through a diode bridge network gating device 16 and a direct current blocking capacitor 17. Diode bridge 16 connects with a suitable source of direct current potential as indicated at 18 in the drawing through a biasing resistor 19. The opposite end of the bridge connects with a resistor 20 which may be selectively connected with ground through switch 21. When the points 22 of switch 21 are in the open position shown in the drawing, all four diodes 23 in diode bridge 16 are biased normally off so that there is in effect substantially an open circuit between the transmitting means 11 and station selector switch 7. By closing contact points 22 on switch 21, resistor 20 is coupled with ground, increasing the positive bias on diodes 23. This allows the diodes to conduct, thus opening the gate and allowing the audio input to microphone 11 to be superimposed in the form of a voltage on the direct current in lead 24. This isolation of the transmitting means 11, except when switch 21 is closed, is necessary to insure proper operation of amplifier 15 and prevent its being overloaded due to the operating of other stations and to the use of a radio signal input into the receiver as hereinafter described. While the gating means is shown as a diode bridge it should be understood that any type of gating device such as that shown in Figure 2 could be used in lieu of the diode bridge without departing from the teachings of this invention.

The receiver section 12 of each station in the interphone system connects with the associated station selector switch 7 through a diode gate 25 which connects at one end with arm 13 and at its opposite end with a biasing resistor 26. The free end of biasing resistor 26 is connected to the base 27 of a suitable transistor 28 through an interphone volume control potentiometer 29. The collector 30 of transistor 28 connects with ground through resistor 31 while the emitter 32 connects with the direct current potential through series resistors 33 and 34. By employing a balancing resistor 35 to couple the source of direct current potential with the receiver section circuit between diode 25 and resistor 26, the transistor 28 as well as diode 25 may be biased normally off to effectively provide a muting circuit for a radio input signal. A capacitor 39 is inserted in the ground lead from interphone volume control potentiometer 29 to serve as a direct current blocking device.

Load resistors 36, 37 and 38 connect interstation lines 4, 5, 6 with the source of direct current potential to provide the biasing potential for diode 25, effectively closing the circuit to current flow except when switch 21 is closed at a station electrically connecting with the particular diode. Then, the voltage in the interstation line is lowered to change the bias on the diode in a manner to open the gate. The receiver headphone or speaker 40 at each station connects with a suitable amplifier 41 which is tied into the circuit between resistors 33 and 34 through a direct current blocking capacitor 42. The audio interphone signals superimposed on the direct current is thereby extracted and amplified to a suitable level for driving the speaker.

In aircraft interphone systems it is important not only to provide communication between various personnel on the ship but also it is important to provide means for monitoring radio signals at at least some of the stations. Provisions for doing this are shown in Figure 1 wherein a radio signal input lead 43 is provided which connects with a radio signal volume control potentiometer 44 which in turn connects with the input to receive amplifier 41. When there is no interphone signal at a particular station the radio signal input is applied to receiver headphones 40. However, as soon as a switch 21 is one of the stations connecting with the particular receiver circuit is closed, the bias on diode 25 is no longer sufficient to prevent current flow therethrough. Accordingly, the potential at base 27 of transistor 28 is lowered to the point where current flow through the transistor occurs. So long as transistor 28 is conducting, the radio input signal is reduced in amplitude causing the same to be substantially less audible at the receiver earphones 40 than is the interphone signal. The interphone signal, on the other hand, is of sufficient strength after amplification by the transmitting section amplifier that even if muted to some extent by the muting circuit it is clearly audible at the receiver earphones. Actually, by employing transistor 28, a slight gain in the interphone signal strength may be obtained while at the same time muting the radio input.

The muting circuit includes transistor 28, resistors 31, 34 and 55, potentiometer 44 and capacitor 42 as well as the input circuit of amplifier 41. When transistor 28 is nonconductive, that is, when the potential at base 27 is essentially at the supply source level, the impedance of emitter 32 is high compared to resistor 34 and the other components of the muting circuit. However, when the potential at base 27 is reduced by closing switch 21 at one of the stations, current flows in emitter 32 and its impedance becomes relatively low. As a result the radio signal strength is lowered or muted.

Resistors 31 and 33 respectively serve to provide a direct current return path to ground and a direct current reference voltage for emitter 32 and as such they are important but not basic elements of the muting circuit per se.

When transistor 28 is in the conducting condition, the interphone signal is coupled to the emitter circuit and thence to amplifier 41 and speaker 40.

It should be noted that transistor 28 may be replaced by a diode bridge like that shown at 16 or any other suitable type of gating device without departing from the teachings of the invention. The transistor is considered excellent here however, because of the availability of power gain which may be usefully employed by the judicious selection of the relative values of many of the components as will be readily apparent to those skilled in the art.

In order to permit any of the plurality of stations to contact one of the other plurality of stations regardless of the position of the station selector switch 7 of the other station, a call circuit 45 which includes a diode gating device 46 is incorporated into the circuit of each interphnoe station so as to connect its associated interphone connecting line (for example, line 4 in the case of station 1 and line 5 in the case of station 2) directly with resistor 26 in the resistance bridge network of receiver section 12. Diode 46 in the call circuit is biased normally off the same as diode 25 and hence it also effectively isolates the receiver section of each station from all other stations except when switch 21 in one or more of the stations is closed, reducing the voltage in one or more of the interphone lines. If station 3 should wish to speak with station 2 for example, the station 3 operator merely positions his selector switch 7 to contact point 9 to complete a circuit with the call circuit in station 2. Then, by closing switch 21 in station 3 the potential in line 5 is lowered causing diode gate 46 in station 2 to open, and lower the base voltage of transistor 28. This allows the transistor to conduct current and effectively mute the radio input signal. At the same time, the station 3 transmitted signal is fed to the input of receiver-amplifier 41 for driving earphones 40 so as to be clearly audible to the station 2 operator even though his particular station selector switch may be set to communicate with a different station.

The circuit shown in Figure 2 illustrates the fact that any suitable type of gating means may be used in the interphone circuit to replace the diodes or transistors if desired without departing from the teachings of the invention. In the transmitting section 11 of Figure 2 a transistor 47 is employed in lieu of the diode bridge 16 of Figure 1. To couple the transmitting section with the rest of the interphone system it is only necessary to close switch 48 which corresponds with switch 21 in Figure 1 to lower the potential at base 49 of the transistor. This allows the transistor to conduct current through resistor 50 to ground thus lowering the potential which is biasing the receiver section circuit off.

In the Figure 2 configuration, transistors 51 and 52 replace diodes 25 and 46 of Figure 1 to selectively isolate the receiver section of each station from the rest of the interphone system when the particular receiver section is not in use. By lowering the potential in lead 4 in Figure 2, the base voltage of both transistors 51 and 52 is reduced accordingly allowing the transistors to conduct current flow through their associated resistors 53 and 54 to ground. This effectively lowers the base voltage on transistor 28, muting the radio input signal while applying the interphone audio signal to receiver amplifier 41 so that it may be heard through the receiver headphones.

While only three stations are shown in Figure 1 it should be understood that normally many more stations will be employed in a single interphone system. It is this use of a large number of stations which necessitates means to effectively couple and de-couple one station from the other. With an isolated system such as is described herein each station operator may receive a different radio input independent from the other stations and be interrupted only when it is desired to communicate with that particular station.

The operation of the interphone system can best be understood by a functional description of the circuit under typical operating conditions. With the switches 21 open at each station as shown in Figure 1 the transmitting and receiver sections 11 and 12 respectively at each station are electrically isolated from each other and the rest of the system by the gating devices such as diode bridge 16 in the transmitting section. Under this operating condition a radio signal input may be received at each station through its own independent receiving section. Thus, the radio signal at the stations may be each different so that one station operator may be in communication with one remote radio transmitter while another station operator may be in communication with a different radio transmitter. The value of this feature of the interphone system is believed obvious not only for aircraft applications but also for many other uses.

When station 2 desires to communicate with station 1 through the interphone system the station 2 operator simply positions arm 13 of his station selector switch 7 to contact point 8 which completes a circuit to call circuit 45 at station 1. He then closes switch 21 to cause current flow through the diode bridge network 16. This effectively reduces the potential in line 4 and opens call circuit 45 in station 1 by allowing diode 46 to conduct. Diode 25 at station 2 is also opened to provide "sidetone" so that the operator may hear his own signal. When diode 46 at station 1 conducts, the base voltage of transistor 28 is lowered, completing a circuit from the source of direct current potential to ground through the transistor to effectively mute the radio input signal and open the receiver section to the audio signal imposed on the direct current voltage in the interphone system. Thus, the interphone audio signal is applied to receiver amplifier 41 to drive head phones 40 in station 1. This provides an audible reproduction of the signal introduced into the transmitting circuit of station 2. If station 1 desires to reply to station 2 a similar procedure is followed wherein selector switch 7 is positioned to contact point 9 and switch 21 is closed thus allowing transmitting section 11 in station 1 to open the gating devices in the receiver section of station 2 and impress an audio signal onto the receiver section amplifier 41 for driving the station 2 headphones. Should station 3 desire to monitor the conversation it is only necessary to position selector switch 7 to either contact points 8 or 9. Should station 3 desire to talk with either station 1 or station 2, station selector switch 7 is positioned to the appropriate contact point and switch 21 is closed to place the station 3 transmitting section 11 into the interphone circuit.

Where a large number of stations are employed, each station may talk with another station independently of the other stations or it may monitor a radio input through its receiver section. By simply adding another interphone connecting line and extra call circuits in parallel with those shown, the system may be made so that any one of the stations can communicate with all of the other stations simultaneously for emergency warning or the like. This versatility of the system may be obtained as taught herein without the use of a single relay and with the use of but one interconnecting line for each station in the basic arrangement.

It should be understood that certain alterations, modifications and substitutions such as those mentioned hereinabove may be made to the istant disclosure without departing from the spirit and scope of the invention as defined by the appended claims.

We claim:

1. An interphone system comprising, a source of direct current potential, a plurality of transmitting and receiving stations, a load resistor coupling the source of direct current potential with each of said stations, said stations each including switch means for coupling one station with any one of the plurality of stations, each station including transmitting means, connecting with said switch means, receiver means connecting with said switch means, gating means interposed between said switch means and the transmitting means and between said switch means and the receiving means electrically isolating one station from the other, and gate control switch means connecting the gating means between the first mentioned switch means and the transmitting means with ground whereby to effect an electrical circuit between the transmitting means and the receiver means of a coupled station.

2. An interphone system comprising, a plurality of transmitting and receiving stations, a source of electrical potential, a load resistor coupling said source of electrical potential with each of said stations, switch means associated with each station for coupling one station to any of the plurality of stations, gating means interposed between stations and normally electrically isolating one from the other, and switch means connecting said source of electrical potential with ground through the associated load resistor whereby to open said gating means and provide electrical communication only between the stations coupled by the first mentioned switch means.

3. An interphone system having a plurality of stations comprising, a plural contact selector switch for each station, a line connecting one selector switch contact at each station with a selector switch contact at each of the other stations, transmitting and receiving means connecting with each selector switch, gating means interposed between each selector switch and its associated transmitting and receiving means and normally isolating one station from the other, a source of direct current potential, impedance means connecting said source of direct current potential with each said line, switch means connecting with each transmitting and receiving means for selectively grounding the circuit and lowering the voltage in the connecting line whereby the gating means at a remote station is closed, electrically connecting the remote station with the transmitting and receiving means.

4. An interphone system having a plurality of stations comprising, a plural contact selector switch for each station, a line connecting one selector switch contact at each station with a selector switch contact at each of the other stations, transmitting and receiving means connecting with each selector switch, gating means interposed between each selector switch and its associated transmitting and receiving means, means connecting with each said line and providing a biasing voltage for said gating means to electrically isolate one station from another, and switch means at each station for lowering the biasing voltage in a line to actuate said gating means and electrically connect one station to another.

5. An interphone system having a plurality of stations comprising, a plural contact selector switch for each station, a line connecting one selector switch contact at each station with a selector switch contact at each of the other stations, transmitting and receiving means connecting with each selector switch, gating means interposed between each selector switch and its associated transmitting and receiving means and normally isolating one station from another, and manually operable switch means carried by at least one station for controlling the gating means of at least two stations.

6. An interphone system having a plurality of stations comprising, a plural contact selector switch for each station, a line connecting one selector switch contact at each station with a selector switch contact at each of the other stations, transmitting and receiving means connecting with each selector switch, gating means interposed between each selector switch and its associated transmitting and receiving means and normally isolating one station from another, and means carried by each station for controlling the gating means of another station through said selector switch.

7. An interphone system having a plurality of stations normally electrically isolated from each other comprising a plural contact selector switch for each station, a line connecting one selector switch contact at each station with a selector switch contact at each of the other stations, transmitting means connecting with each selector switch, receiving means connecting with each selector switch, bias controlled gating means interposed between each selector switch and its associated transmitting and receiving means and normally isolating one station from the other, bias control means associated with each transmitting means for actuating said gating means and electrically connecting one station with another through said selector switch, and said receiver means including a radio signal input circuit, and means connecting with each said radio signal input circuit and responsive to the associated gating means for automatically muting the radio signal so long as the associated gating means is actuated by said bias control means.

8. An interphone system comprising, a plurality of transmitting and receiving means, a source of direct current potential, impedance means connecting said source of direct current potential with said transmitting and receiving means, gating means coupling said transmitting and receiving means and normally biased through said impedance means to electrically isolate the transmitting and receiving means from each other, and switch means connecting with each transmitting means for selectively changing the bias on said gating means to electrically couple said transmitting and receiving means whereby sound may be transmitted through the system.

References Cited in the file of this patent

UNITED STATES PATENTS

| | | |
|---|---|---|
| 2,529,912 | Campbell | Nov. 14, 1950 |
| 2,545,476 | Levy | Mar. 20, 1951 |
| 2,629,022 | Wall | Feb. 17, 1953 |
| 2,658,947 | Liberman | Nov. 10, 1953 |